(12) United States Patent
Lewis

(10) Patent No.: US 11,792,306 B2
(45) Date of Patent: Oct. 17, 2023

(54) NETWORK PROTOCOL FOR VIEW REPLICATION OVER UNRELIABLE NETWORKS

(71) Applicant: Improbable Worlds Limited, London (GB)

(72) Inventor: Matthew John Reveley Lewis, London (GB)

(73) Assignee: Improbable Worlds Limited, London (GB)

( * ) Notice: Subject to any disclaimer, the term of this patent is extended or adjusted under 35 U.S.C. 154(b) by 142 days.

(21) Appl. No.: 17/090,965

(22) Filed: Nov. 6, 2020

(65) Prior Publication Data

US 2022/0150331 A1 May 12, 2022

(51) Int. Cl.
*H04L 69/16* (2022.01)
*H04L 47/193* (2022.01)

(52) U.S. Cl.
CPC ............ *H04L 69/16* (2013.01); *H04L 47/193* (2013.01)

(58) Field of Classification Search
None
See application file for complete search history.

(56) References Cited

U.S. PATENT DOCUMENTS

| | | | | |
|---|---|---|---|---|
| 8,018,894 B2* | 9/2011 | Roy | ...................... | H04W 36/06 455/39 |
| 8,265,041 B2* | 9/2012 | Mason | ...................... | H04L 1/20 370/336 |
| 9,420,490 B2* | 8/2016 | Jia | .............................. | H04L 1/04 |
| 10,878,146 B2* | 12/2020 | Lewis | ............ | G06Q 10/063116 |
| 2004/0013115 A1* | 1/2004 | Su | ......................... | H04L 1/0083 370/469 |
| 2011/0064064 A1* | 3/2011 | Hassan | ................. | H04W 40/02 370/338 |
| 2013/0229916 A1* | 9/2013 | Isobe | ...................... | H04L 47/25 370/230 |
| 2018/0103394 A1* | 4/2018 | Gholmieh | ............... | H04L 47/32 |
| 2020/0077294 A1* | 3/2020 | Kim | ....................... | H04L 1/1635 |
| 2020/0213152 A1* | 7/2020 | Choquette | ............ | H04L 63/029 |
| 2022/0141694 A1* | 5/2022 | Miao | ..................... | H04B 17/345 370/252 |
| 2022/0141751 A1* | 5/2022 | Yao | ........................ | H04W 40/36 370/331 |
| 2022/0149989 A1* | 5/2022 | Kilian | ................ | H03M 13/2778 |
| 2022/0150331 A1* | 5/2022 | Lewis | ...................... | H04L 69/16 |

* cited by examiner

*Primary Examiner* — Kodzovi Acolatse
*Assistant Examiner* — Anindita Sen
(74) *Attorney, Agent, or Firm* — Banner & Witcoff, Ltd.

(57) ABSTRACT

Methods and systems for providing a network protocol for view replication over an unreliable network are described herein. A sender and a receiver may apply a branching time model to the history of views to replicate the views consistently. The sender may send a first data packet to receiver. The first data packet may comprise a first sequence number identifying the first data packet, a source version number, and a first set of one or more changes to be applied to a first state identified by the source version number. Based on a determination that an acknowledgment message indicating receipt of the first data packet is not received, the sender may send a second data packet to the client device. The content of the second data packet may be determined based on the first data packet.

20 Claims, 8 Drawing Sheets

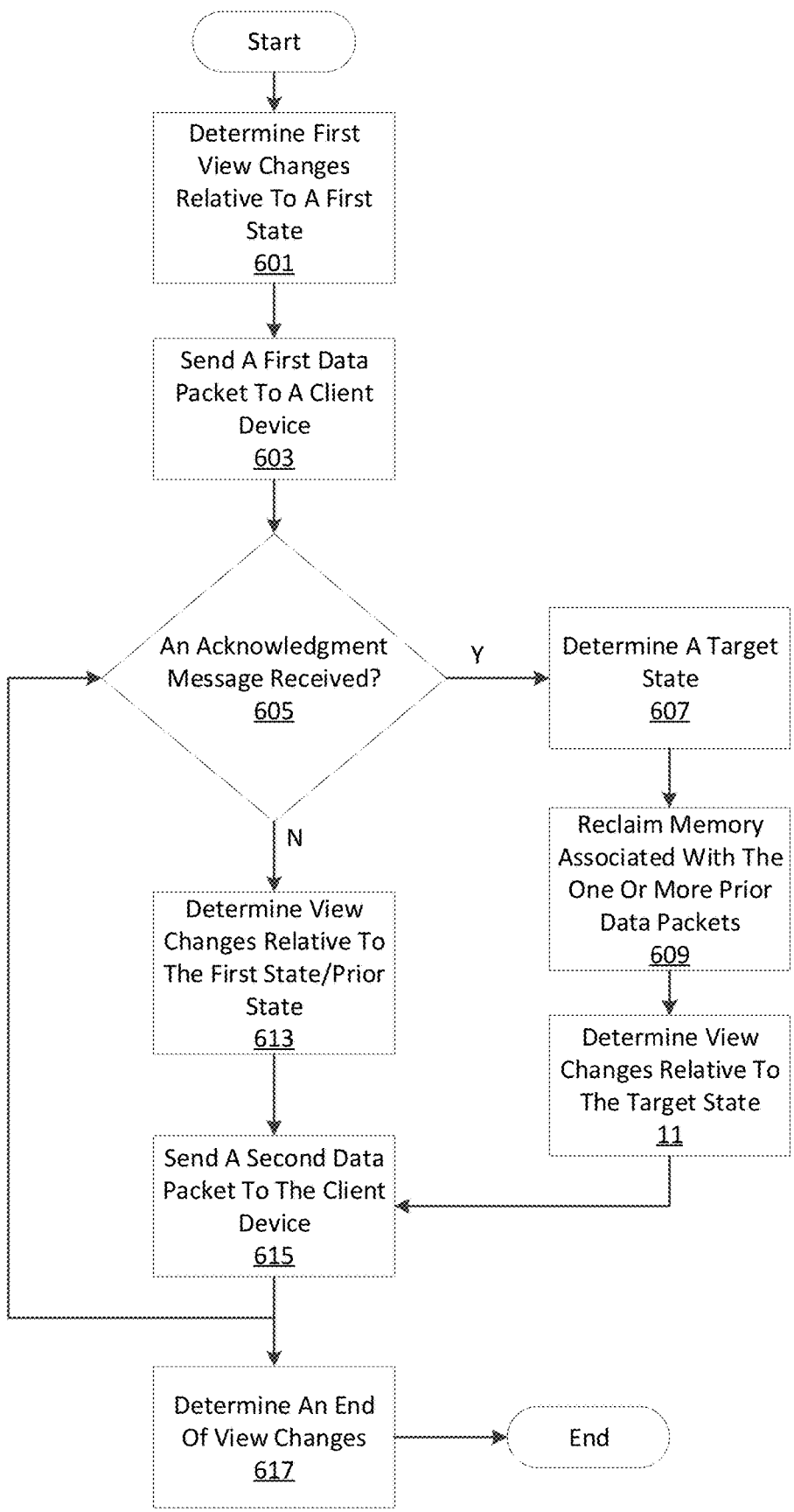

NETWORK PROTOCOL FOR VIEW REPLICATION OVER UNRELIABLE NETWORKS

FIELD

Aspects described herein generally relate to computers, networking, hardware, and software. More specifically, some aspects described herein relate to network protocols for replicating views and/or states over unreliable networks.

BACKGROUND

In an online video game, it is important to ensure all players have the same and consistent view of the game state with low latency. A game server synchronizes all players' states based on time and players' inputs by constantly exchanging messages with client devices and sending updates to each client via a communication channel such as Internet. Maintaining a consistent view among all devices is a complicated and resource intensive process, dependent heavily on network transmission reliability.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A communication channel for exchanging messages between one or more game servers and client devices may drop and/or delay messages. One way to solve this problem is to inform the server when the client devices have received the messages and then allow the server to send the next messages, but this method may cause delays in replicating and synchronizing the game views, because a server may be required to resend a lost message before sending another update. Therefore, there is a need to establish a network protocol that efficiently and accurately replicates views with low latency over unreliable networks.

To overcome limitations in the prior art described above, and to overcome other limitations that will be apparent upon reading and understanding the present specification, aspects described herein are directed to a network protocol for view replication over unreliable networks.

A first aspect described herein provides a method for replicating a state view. The method may comprise sending, by a computing device, a first data packet to a client device. The first data packet may comprise a first sequence number identifying the first data packet, a source version number, and a first set of one or more changes to be applied to a first state identified by the source version number. The method may further comprise determining whether an acknowledgment message is received by the computing device. The acknowledgment message may indicate receipt of the first data packet by the client device. The method may further comprise, based on a determination that the acknowledgment message is not received by the computing device, sending a second data packet to the client device. The second data packet may comprise: a second sequence number identifying the second data packet, the source version number, and a second set of one or more changes to be applied to the first state identified by the source version number. The second set of one or more changes may comprise the first set of changes and a third set of changes, and each change of the third set of changes may be absent from the first set of changes (e.g., new changes since the previous message was sent).

A second aspect described herein provides a different method for replicating states and/or views across multiple devices. The method may comprise identifying, by a sending device, a currently agreed state between the sending device and a second device. The method may further comprise determining a list of unacknowledged changes to the currently agreed state, wherein each unacknowledged change represents a change to the currently agreed state that has not been acknowledged by the second device. The method may further comprise generating a delta message comprising an identifier of the currently agreed state, a message ID, and the list of unacknowledged changes to the currently agreed state. The method may further comprise checking for receipt of one or more acknowledgement messages from the second device, wherein each acknowledgement message identifies a message ID for one of the previously sent delta messages and a new currently agreed state. The new currently agreed state may be based on applying the list of changes in the delta message having the identified message ID to the previously agreed state. The method may further comprise marking as acknowledged each change included in any delta message identified by the one or more received acknowledgement messages. In addition, the method may comprise repeating the identifying, determining, generating, checking, and marking steps to maintain state consistency between the sending device and the second device. The frequency of performing the above steps may be predetermined or may be dynamic and variable based on whether there is any unacknowledged state and/or the latency between the sending device and the second device. In this way the intervals may be predetermined, dynamic, fixed, unfixed, variable, state dependent, latency dependent, and/or based on any other environment variable.

In various embodiments, either or both methods may be performed by a data processing device, system and/or apparatus. In yet other embodiments the method may be embodied within a non-transitory computer-readable medium. The non-transitory computer-readable medium store instructions which, when executed by a processor, may cause a data processing system, device, or apparatus to perform the method for replicating states and/or views.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 6 is a flow chart showing an example method for sending data packets over an unreliable network.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Figure 1:
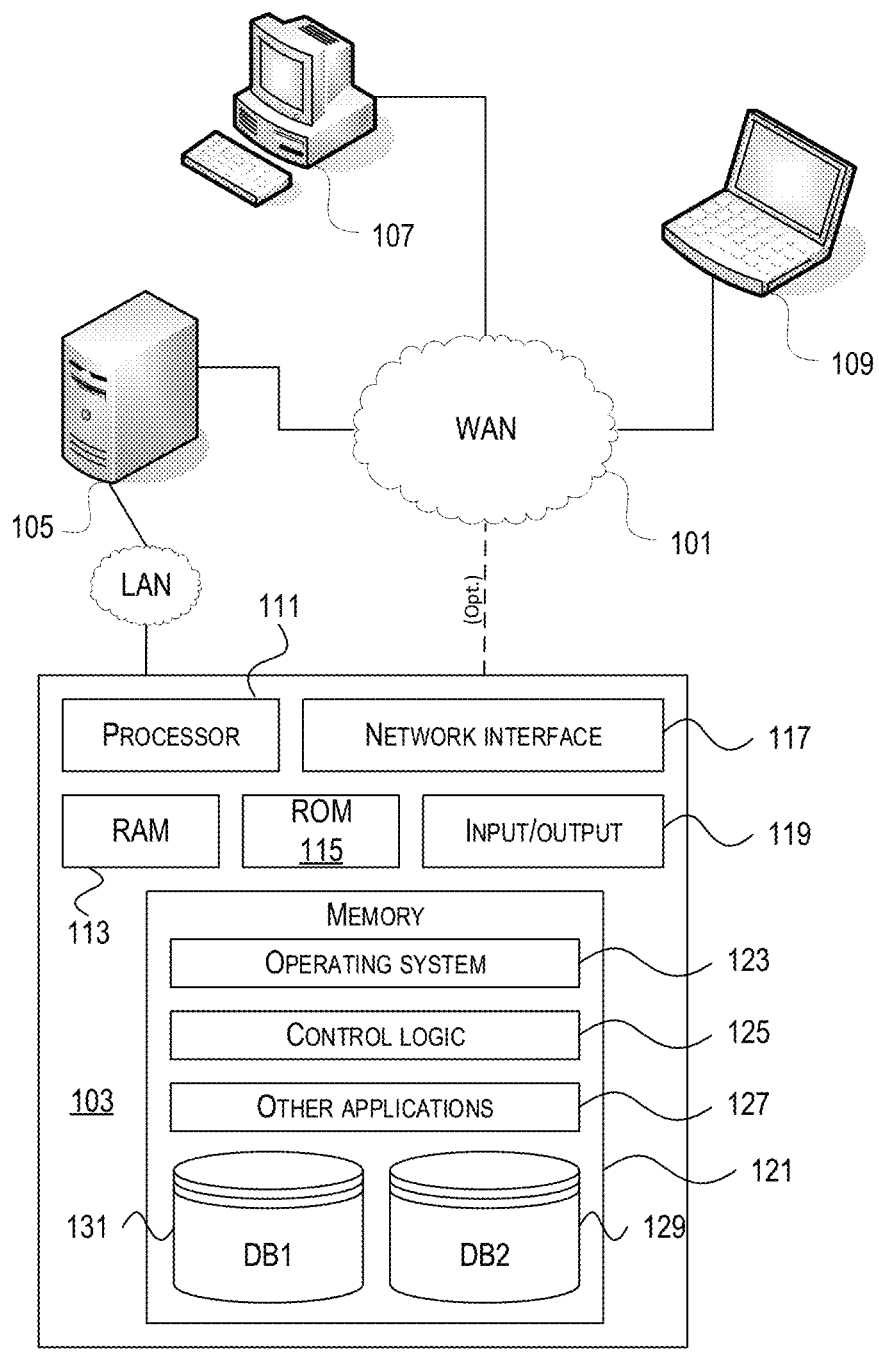
FIG. 1 illustrates an example of a network architecture and data processing device.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
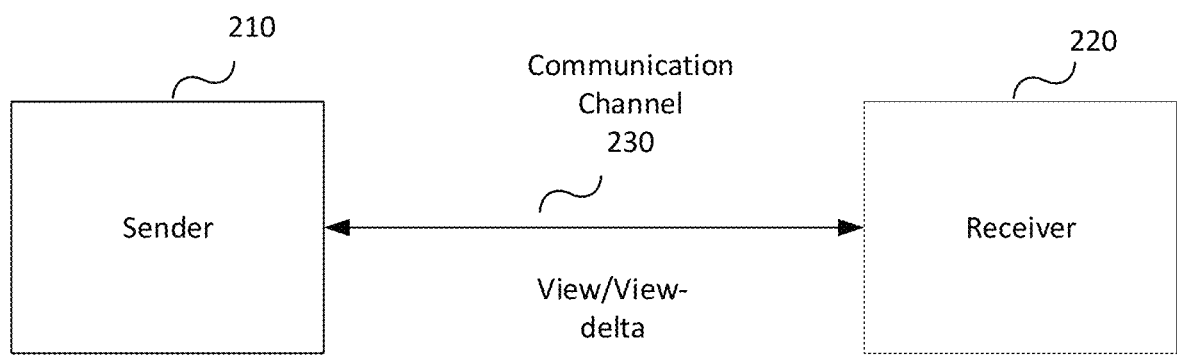
FIG. 2 illustrates an example of a communication structure between a sender and a receiver.

FIG. 2 shows an example of a communication structure between a sender and a receiver for replicating views. In FIG. 2, a sender 210 may be a computing device (e.g., the data server 103, the web server 105, a game server, a spatially-optimized game simulator) configured to generate and/or modify a shared object between the sender 210 and a receiver 220. The share object may comprise a view (e.g., a piece of state shared between the sender 210 and the receiver 220). For example, the view may be a game state shared between the sender 210 and the receiver 220 (e.g., client computers 107, 109, a mobile phone, a tablet, a game terminal). In a video game, a view may comprise information indicating the positions of one or more entities (e.g., players, cars, trees) and/or artificial intelligence (AI) characters in the game world, map information associated with the one or more entities and/or other components of the game, and/or leaderboard information.

The receiver 220 may be configured to receive and update the shared object between the sender 210 and the receiver 220. For example, the receiver 220 may receive views and/or view deltas (e.g., the differences between the views, view changes in a game environment based on time and user inputs) from the sender 210, and synchronize the views with the sender 210 by processing (e.g., applying, replicating) the received views and/or view deltas. The sender 210 and the receiver 220 may use a branching time model to depict a view history, which may comprise a directed graph of versions of the view. The sender 210 and the receiver 220 may work together to achieve consensus on the view history based on a network protocol. The network protocol will be described in detail below. In some examples, a device may be both a sender and a receiver at the same time to transmit and receive different and/or parallel shared objects. The sender 210 may send a shared object to the receiver 220, and the receiver 220 or another computing device may also send a different shared object to the sender 210. Multiple objects (e.g., states, views) may be synchronized over a single connection and potentially in different directions.

The sender 210 and the receiver 220 may exchange messages (e.g., datagrams comprising game views or game view deltas) with each other over a communication channel 230 (e.g., the Internet). But the communication channel 230 may be an unreliable network. For example, messages sent from the sender 210 to the receiver 220 may be dropped and/or delayed, and the order of the messages may be modified due to the unreliability of the underlying network. When the messages are exchanged between the sender 210 and the receiver 220 based on a user datagram protocol (UDP), the communication channel 230 might not offer any guarantee for data delivery, ordering, and/or replication because UDP might not use message sequencing or message acknowledgement between the two communicating participants (that is, UDP prioritizes low latency over the potential for data loss/reordering). Therefore, when the communication channel 230 is an unreliable network, it may be important to establish a network protocol (e.g., an application-level protocol on top of UDP) that ensures both the sender 210 and the receiver 220 share the same object, while having a low latency and using a relatively low bandwidth.

Figure 3A:
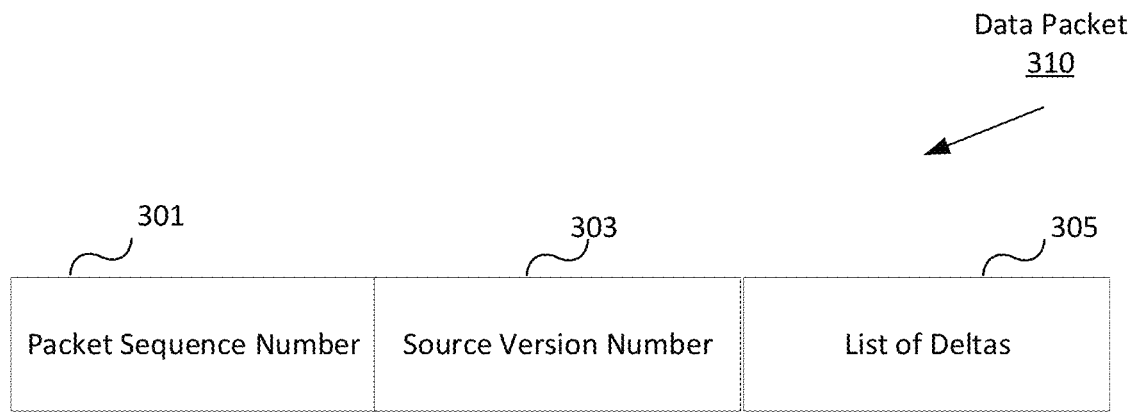
FIGS. 3A-3B illustrate examples of a data packet.

FIG. 3A describes an example of a data packet 310 sent by a sender (e.g., the sender 210) to a receiver (e.g., the receiver 220) via an unreliable network. The data packet 310 (e.g., DeltaPacket) may comprise a sequence number 301 associated with the data packet 310, a source version number 303, and/or a list of deltas 305 (e.g., view changes/differences relative to the view associated with the source version number). The sequence number 301 may uniquely identify the data packet 310. The source version number 303 may indicate a source head state in a branch pattern/model (e.g., a pattern of a view history associated with the sender and the receiver). Details of the source version number and the list of deltas will be described in connection with FIGS. 4A-4B. The semantics of the data packet may be to the effect of "this is message <sequence number>, and in it I propose that you start at source version <source version number> and apply <deltas> to produce a new state."

Figure 3B:
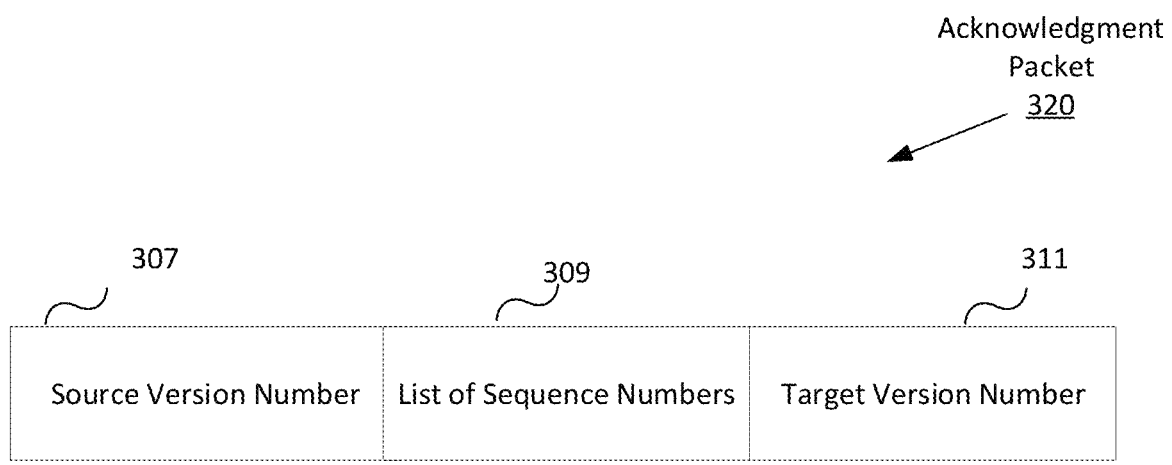

After the data packet is received by a receiver (e.g., the receiver 220), the receiver may respond with an acknowledgment data packet (e.g., AckPacket). FIG. 3B describes an example of an acknowledgment data packet 320 sent by the receiver to the sender. The acknowledgment data packet 320 may serve as an acknowledgment message indicating receipt of the data packet 310 sent by the sender. The acknowledgment data packet 320 may comprise a source version number 307, a list of sequence numbers 309, and/or a target version number 311. The source version number 307 may be the same as the source version number included in the data packet 310 sent from the sender (e.g., the source version number 303). In this way, the acknowledgment data packet 320 may indicate that the receiver has received the source version number 307 and has applied the deltas to the source head state indicated by the source version number 307. The list of sequence numbers 309 may identify the data packets that the receiver has received during a time period (e.g., a predetermined time interval). The target version number 311 may be a number of a new state produced by applying the deltas to the source head state. The new state may be added to the graph of view history. For example, the target version number 311 may be equal to the source version number plus one. The semantics of an acknowledgment message may be to the effect of "the receiver started with version <source version number> and applied all of the deltas in the packets identified by <list of sequence numbers >, producing a new version <target version number>."

After the sender receives the acknowledgment data packet 320 sent by the receiver, the sender may determine a new source version number for the next data packet that is about to be transmitted to the receiver. The determination of the new source version number may be based on one or more target version numbers in one or more acknowledgment data packets that the sender has received. For example, the new source version number may be the largest target version number among the one or more target version numbers that the sender has received. Details of the target version number will be described in connection with FIGS. 4A-4B.

Figure 4A:
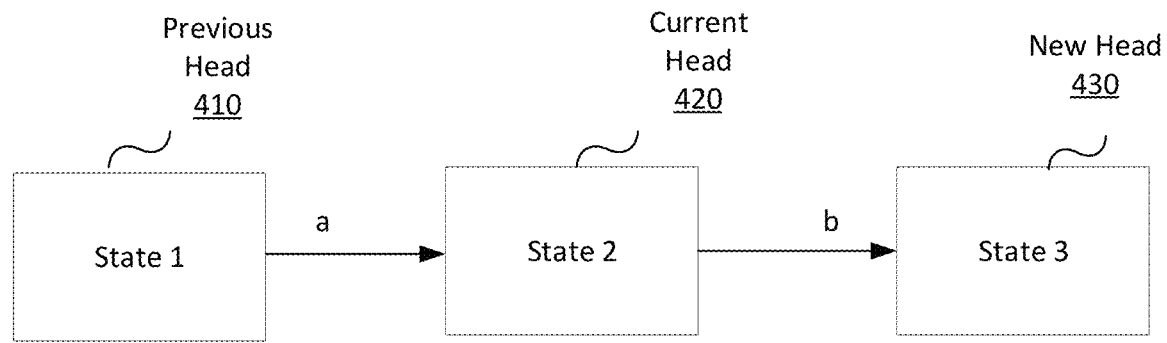
FIGS. 4A-4B illustrate examples of a branching time model associated with data replication.
Figure 4B:
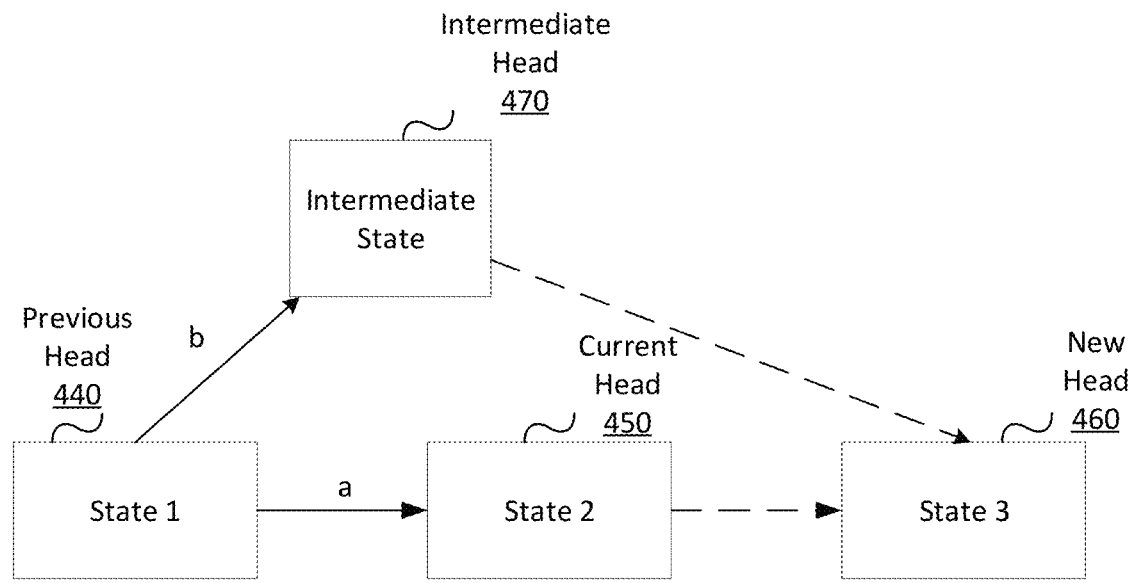

FIGS. 4A-4B illustrate examples of a branching time model associated with data replication. A view history graph may be initialized on both the sender and receiver to contain a single state with version number 0 which maps to an empty view. When the receiver processes a data packet, the receiver may add a new state and a new edge to the view history graph. Each state may represent a view of a graphically depicted visual simulation.

FIG. 4A shows an example of a view history graph. The view history graph may comprise one or more states and deltas (e.g., the deltas 305) between two of the states. For example, the view history graph may comprise a previous head 410 associated with state 1, a current head 420 associated with state 2, and a new head 430 associated with state 3. The delta between state 1 and state 2 may be "a" and the delta between state 2 and state 3 may be "b." Each state may be associated with a source version number (e.g., the source version number 303, the source version number 307) that identifies the state. In addition, each state may represent a particular view in an interactive visual simulation with respect to a time point (e.g., real-time or logical time). A head state may represent the latest view and/or view delta. The head states of the sender and receiver may be synchronized to reflect the latest development in the visual simulation.

When the receiver receives a data packet from the sender, the received source version number (e.g., the source version number 303) may be compared with the current head state number. If the source version number received by the receiver is the same as the current head state number (e.g., the current head 430), as shown in FIG. 4A, the receiver may add a new state following the current head state, and the new state may become the new head state (e.g., the new head 430). In this case, no further modifications might be made to the view graph because the new head may immediately follow the current head and no intermediate state might be created.

However, due to the unpredictable nature of an unreliable network between the sender and the receiver, the head states in the sender and the receiver may be different. FIG. 4B shows an example of a view history graph that comprises a previous head 440 associated with state 1, a current head 450 associated with state 2, a new head 460 associated with state 3, and an intermediate head 470 associated with an intermediate state. In this case, the receiver may receive a first data packet comprising a sequence number identifying the first data packet, a first source version number associated with state 1, and delta "a." Delta "a" may comprise information indicating the view changes between the time associated with state 1 and a first time (e.g., the time when the sender sends the first data packet). Then the receiver may apply delta "a" to state 1 and create state 2, which is associated with the current head 450. The receiver may send an acknowledgment data packet to the sender acknowledging the receipt of the first data packet, but the sender may not have received the acknowledgment data packet because, for example, the network is slow. The sender, without having received the acknowledgment data packet or waiting to receive the acknowledgment data packet, may send a second data packet to the receiver.

The second data packet may comprise a sequence number identifying the second data packet, the first source version number associated with state 1, and delta "b." Delta "b" may comprise information indicating the view changes between the time associated with state 1 and a second time (e.g., the time when the sender sends the second data packet). The second time may be later than the first time and delta "b" may be different from delta "a." Because the sender has not received the acknowledgment data packet, the second data packet may also comprise the first source version number associated with state 1.

The receiver may receive the second data packet before or after receiving the first data packet. The receiver may notice that the first data packet and the second data packet comprise the same first source version number. In this case, the receiver may receive two data packets relative to the same state indicated by the same source version number. If the receiver receives the second data packet after receiving the first data packet, the receiver may separately apply delta "b" to state 1 and create an intermediate state because the receiver has already applied delta "a" to state 1 and created state 2. The intermediate state may be associated with the intermediate head 470. The receiver may merge the two branches associated with the intermediate state and state 2 (e.g., the dotted lines shown in FIG. 4B) and create state 3.

In order to merge the two branches and determine the view changes relative to state 2, the receiver may determine a relation between delta "a" and delta "b," and determine a new delta relative to state 2 based on the determination. The receiver may compare delta "a" and delta "b," and determine a difference between delta "a" and delta "b." If delta "b" comprises delta "a," the new delta may be the differences between delta "b" and delta "a." For example, if delta "a" indicates that an entity in a game moves 10 feet ("feet" may be converted to a corresponding distance in the game) in the east direction, and delta "b" indicates that the entity moves 25 feet in the east direction, the new delta relative to state 2 may be that the entity moves 15 feet in the east direction because delta "a" has already been applied. If delta "b" is not related to delta "a" (e.g., delta "b" does not depend on delta "a"), the new delta may be delta "b" itself. In this case, the receiver may apply delta "b" to state 2 to create state 3. For example, if delta "a" indicates adding a new entity in a game, and delta "b" indicates adding a component (e.g., a subset of a state and/or behavior such as mass or velocity attributed to an entity) to a different existing entity, the new delta relative state 2 may be only delta "b." After the receiver merges the two branches associated with the intermediate state and state 2, the intermediate state and the related branch (e.g., the top dotted line shown in FIG. 4B) may be removed from the view history graph and/or removed from an associated memory by the receiver.

FIG. 4B shows an example of merging two branches in a view history graph. The merging process performed by the receiver may not be limited to the number of states, and/or branches shown in FIG. 4B. The receiver may gather all of the deltas that appear in each branch, and may deduplicate the deltas by ignoring the deltas (e.g., delta "a") from the new branch that already appear on the portion of a branch between a branch point/node (e.g., the previous head 440) and a current head (e.g., the current head 450).

To ensure that the receiver receives sufficient information so that each delta in the data packet may be applied immediately after the data packet is received, the sender may resend deltas that have already been sent. The sender may determine what delta(s) to be included in a data packet based on the relation between a new delta and an in-flight delta (e.g., the sender has sent a data packet including the delta, but has not yet received an acknowledgment message indicating the receipt of the delta). If the order of applying the new delta and the in-flight delta does not affect the view (e.g., applying the new delta before the in-flight delta results in a different view than applying the in-flight delta before the new delta), the sender may not resend the in-flight delta and may just send a data packet comprising the new delta. Alternatively, the sender may resend the previously sent data if the acknowledgement message indicating the receipt of the previously sent data is not received after a threshold period of time.

If the order of applying the new delta and the in-flight delta affects the view, the sender may send a data packet comprising both the new delta and the in-flight delta. For example, if the in-flight delta indicates adding a new entity, and the new delta indicates adding a component to the new entity, the new delta may depend on the in-flight delta because the new delta may not be processed before the in-flight delta is processed. In this case, the sender may send a data packet comprising both the new delta and the in-flight delta. The sender may gather all in-flight deltas that the new delta depends on, compile the in-flight deltas into a list of the deltas following the new delta, and insert all the deltas into a data packet. For example, the list of deltas 305 included in the data packet 310 may comprise all the in-flight deltas that the new delta depends on. Even though some of the in-flight delta may be sent more than once by the sender, the receiver may be able to process the newly received data packet immediately because the data packet comprises sufficient information for the view changes. When the sender learns about a state indicated by the target version number from the receiver (e.g., by receiving an acknowledgment message indicating the target version number), the sender may reconstruct the contents of the view in that state exactly the same as the receiver. Further, every delta that is visible on the sender may eventually become visible to the receiver, and synchronized by the receiver.

The sender may have to keep track of the data packets the sender has sent and the list of deltas included in the data packets, in order to reconstruct states and determine what deltas need to be included in the next data packet. Similarly, the receiver may have to keep track of the states it has produced. However, there might not be sufficient memory space for the sender and/or the receiver if the sender and the receiver need to record and store all the information they have produced, sent, and received. Garbage collected techniques may be used for management of the memory related to the sender and the receiver.

The sender may store each one of the sequence numbers identifying the data packets the sender has sent and the deltas included in each data packet. The relation between a delta and a data packet may be a many-to-many relation. Each data packet may comprise more than one delta, and each delta may be included in more than one data packet.

The following garbage collections rules may be applied for memory management. When an acknowledgment message is received, each sequence number identifying a data packet (e.g., the data packet 310) and/or each delta included in the data packet identified by the acknowledgment message may be removed (e.g., delete, forget) from a memory by the sender (e.g., the sender may reclaim the resources used by the sequence numbers and deltas). Additionally or alternatively, data packets that are no longer associated with any recorded delta may be removed. In this way, the sender may constantly free up portions of the memory and need to keep only a finite amount of storage.

Figure 5A:
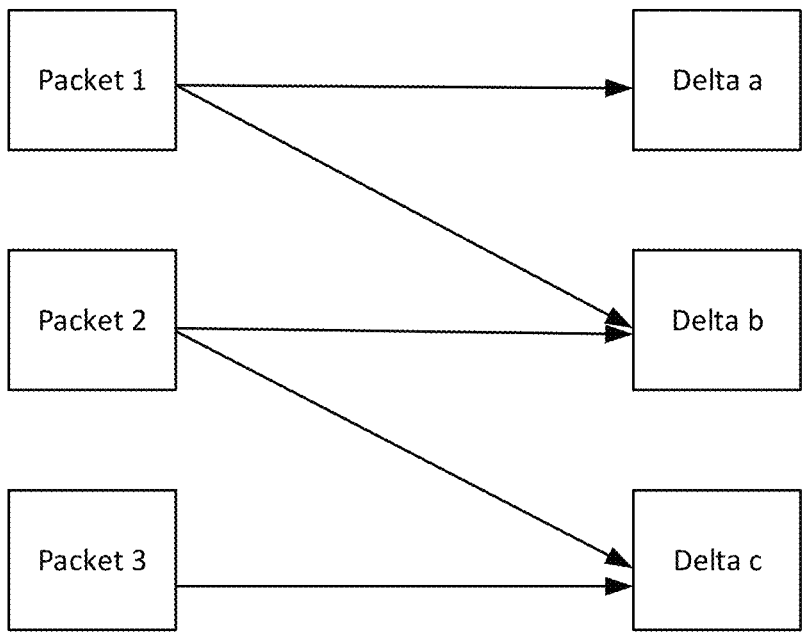
FIGS. 5A-5B illustrate examples of garbage collection on a sender.
Figure 5B:
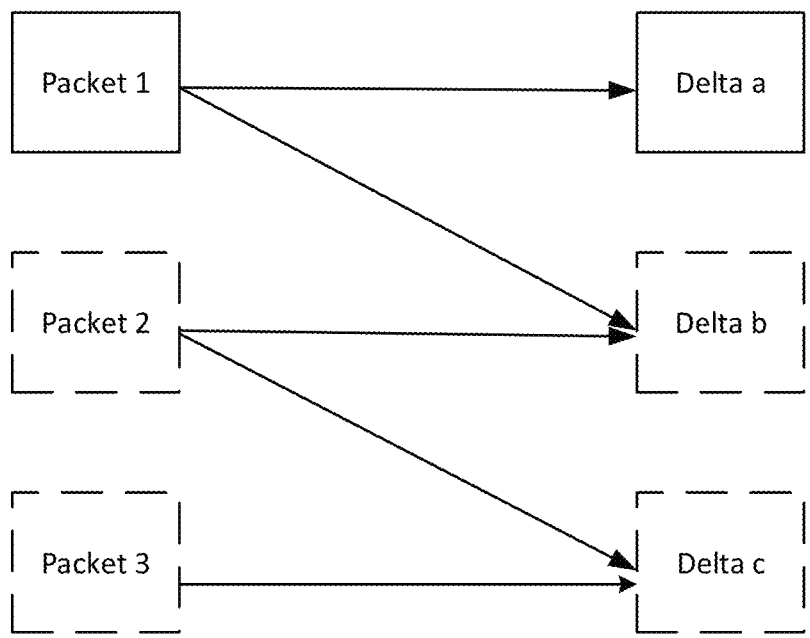

FIGS. 5A-5B illustrate examples of garbage collection on a sender. In FIG. 5A, packet 1 (e.g., a data packet) generated by the sender comprises delta "a" and "b," packet 2 generated by the sender comprises delta "b" and "c," and packet 3 generated by the sender comprises delta "c." When the sender receives an acknowledgment message comprising sequence number 2 identifying packet 2, the sender may be informed that the receiver has received packet 2.

Based on the garbage collections rules described above, the sender may remove deltas "b" and "c" from a memory because they are included in packet 2. As a result, packet 3 may not be associated with any deltas, so the sender may remove packet 3 from the memory as well. In FIG. 5B, the dotted lines indicate the packets and the related deltas that may be removed from the memory. When the sender receives an acknowledgment message comprising sequence number 2 identifying packet 2, the sender may store information only related to packet 1 and delta "a."

The receiver may record states that the receiver has added to the view history graph, the deltas that have been applied to transform states in the view history graph, and/or the sequence numbers of data packets that created each state in the view history graph. In order to minimize the amount of storage associated with the receiver, the following rules may be applied. If the receiver receives a data packet comprising a source version number "X," the receiver may remove data packets associated with a source version number that is smaller than "X" from the memory, because the sender may always send data packets relative to the largest source version number known to the sender. Therefore, any in-flight data packets that comprise a source version number smaller than "X" may be treated as lost packets, and the sender may resend the in-flight deltas in that packet based on source version number "X." In this way, the receiver may constantly free up portions of the memory and need to keep only a finite amount of storage.

Alternatively, the receiver may remove data packets associated with a source version number smaller than "X−1" from the memory, because removing each source version number smaller than "X" might potentially lead to undesirable results. For example, if two data packets are reordered, the reordered data packets may cause the receiver to drop data packets and/or deltas based on the above rules. The following example illustrates how packet reordering might introduce extra latency into the view replication protocol when the above rule of removing data packets associated with each source version number smaller than "X" (i.e., keep state X) is applied. The sender may send a first data packet comprising delta "a" and a source version number 0, and send a second data packet comprising delta "b" and the source version number 0. Delta "a" and delta "b" may be unrelated so that delta "b" might not comprise delta "a." The receiver may receive the second data packet first and create state 1 by applying delta "b" to state 0. The receiver may then send an acknowledgment message indicating that the second data packet has been received and state 1 has been created. The sender may receive the acknowledgment message and send a third data packet comprising delta "c" and a source version number 1. The receiver may receive the third data packet and create state 2, and remove information associated with state 0 because the receiver has been informed that the sender knows about state 1. After the receiver removes the information associated with state 0, the receiver may receive the first data packet with the source version number 0, but the receiver may not be able to process the first data packet (e.g., because the receiver has forgotten about state 0). Consequently, the receiver may ignore (e.g., pretend it has never received) the first data packet or may send a message to the sender indicating that the first data packet has been received but might not be processed. The sender may determine that the first data packet has been lost (e.g., because a timeout occurs, the sender has received the receiver's message indicating that the first data packet might not be processed). Therefore, the sender may have to send a fourth data packet comprising delta "a" and the source version number 1 (or 2 depending on whether an acknowledgment message regarding the third data packet has been received) to make up for the lost first data packet. In this case, the sender may have to send more than one data packet comprising the same delta "a" because of the applied "keep state X" garbage collection rule.

To avoid this issue, the receiver may remove each source version number smaller than "X−1" from the memory (i.e., keep state X−1) to reduce the chance of data packets and/or deltas being dropped or sent multiple times for this reason. If this "keep state X−1" garbage collection rule is applied in the previous example, after the receiver receives the third data packet, the receiver may still keep the information associated with state 0 and may be able to immediately apply delta "a" after the receiver receives the first data packet. In this way, delta "a" may be applied to the receiver earlier than the previous example when the "keep state X" garbage collection rule is applied. Therefore, the latency of applying delta "a" may be reduced. In some other examples, other rules such as "keep state X−y" (y is an integer small than X) may be selected and applied based on the system storage capacities and latency preferences.

Figure 5C:
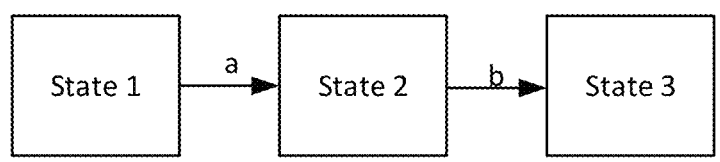
FIGS. 5C-5D illustrate examples of garbage collection on a receiver.
Figure 5D:
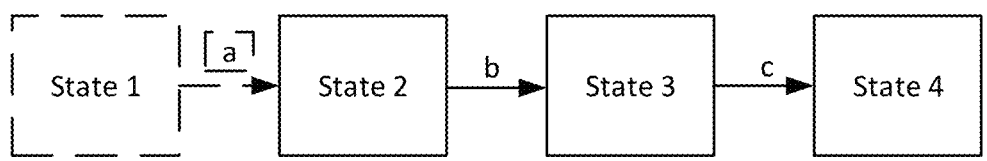

FIGS. 5C-5D illustrate examples of garbage collection on a receiver. FIG. 5C shows an example view history graph that comprises state 1, state 2, state 3, delta "a," and delta "b." If the receiver receives a data packet from the sender comprising source version number 3, the receiver may remove any data packets that comprise the source version number smaller than 2 (X−1) from a memory based on the above rules. In FIG. 5D, the dotted lines indicate state 1 and the related deltas (e.g., delta "a") that may be removed from the memory. Because state 3 may be the largest source version number that have been received by the receiver, the receiver may remove any data packets that comprise the source version number smaller than 2 from the memory. Alternatively, the receiver may remove any data packets that comprise the source version number smaller than 3 from the memory.

FIG. 6 is a flow chart of an example method for sending data packets over an unreliable network. Steps of the method may comprise sending data packets when an acknowledgment message for a prior data packet is not received. The method may describe a network protocol for an efficient and accurate view and/or state replication and tracking process over an unreliable network between a sender and a receiver. The method may ensure that (1) a relatively small amount of data needs to be transmitted between the sender and the receiver; (2) each data packet sent by the sender or receiver may be processed immediately after being received; (3) latency at the receiver is bounded (e.g., a change made to the sender's view is reflected in the receiver's view within a fixed time bound); (4) latency is low even during periods when one or more data packets are dropped; (5) the use of bandwidth is efficient; and (6) complex view data types such as nested structures, maps, lists, sets, and/or queues are supported for view replication and synchronization. The description of FIG. 6 includes examples of computing devices that may perform various steps. However, any or all of those steps (and/or other steps) may be performed by one or more other computing devices. One or more steps may be combined, sub-divided, omitted, or otherwise modified, and/or added to other steps. The order of the steps may be modified.

At step 601, a computing device (e.g., the sender 210) may determine first view changes (e.g., a set of view changes of a graphically depicted visual simulation) relative to a first state. The first state may be a currently agreed state between the computing device and a client device (e.g., the receiver 220). For example, the first state may comprise information related to the positions of players in a video game. The first view changes may be the changes to the views of the first state based on a first time point (e.g., a current time point). For example, a player may move to a new position at the first time point, and the computing device may determine the view changes between the new position and the previous position.

At step 603, the computing device may generate a first data packet (e.g., the data packet 310) and send the data packet to the client device. The first data packet may comprise a sequence number identifying the first data packet, a source version number, and/or a list of deltas. Because the first view changes may not be properly applied without other view changes being applied first, the first data packet may comprise any unsent or unacknowledged view changes (e.g., in-flight deltas) that the first view changes depend on to ensure that the first view changes may be applied immediately after they are received by the client device. If the first data packet is the initial data packet transmitted between the computing device and the client device, there may be no unsent or unacknowledged view changes. The first data packet in that instance might contain only a sequence number identifying the data packet and a list of deltas. The first data packet may be encoded before being transmitted to the client device. Additional details about the data packet have been described in connection with FIG. 3A.

At step 605, the computing device may determine whether an acknowledgment message has been received by the computing device. The acknowledgment message (e.g., the acknowledgment packet 320) may indicate the receipt of the first data packet sent by the computing device. The acknowledgment message may comprise a source version number, a list of sequence numbers, and/or a target version number. The source version number may be the same as the source version number included in the first data packet. The target version number may immediately follow the source version number (e.g., the target version number=the source version number+1).

If the acknowledgment message has been received by the computing device, step 607 may be performed. At step 607, the computing device may determine a target state. The target state may be indicated by the target source number included in the acknowledgment message. The target state may indicate a latest state (e.g., a current head state) in the view history graph reconstructed by the receiver.

At step 609, the computing device may reclaim memory associated with the first data packet. After the computing device has received the acknowledgment message, the computing device may reclaim memory and free up resources related to the sequence number identifying the first data packet, the source version number, and/or the list of deltas included in the first data packet.

At step 611, the computing device may determine second view changes relative to the target state. The determined second view changes may not include the first view changes because the first view changes have been applied by the receiver. The second view changes relative to the target state may be the changes to the views of the target state based on a second time point (e.g., a new current time point which may be different from the first time point).

If the acknowledgment message has not been received by the computing device, step 613 may be performed. At step 613, the computing device may determine third view changes relative to the first state. The third view changes relative to the first state may be the changes to the views of the first state based on a third time point (e.g., a new current time point which may be different from the first time point and the second time point), which may be different from the second view changes. The third view changes relative to the first state may comprise the first view changes and fourth view changes. Each change of the fourth view changes may be absent from the first view changes. For example, the first view changes may comprise a player moving to a new position at the first time point and the third view changes may comprise the player moving to the new position, and another player moving to a different position. The fourth view changes may comprise the movement of the another player, which may not be included in the first view changes.

At step 615, the computing device may generate and send a second data packet to the client device. The second data packet may comprise a sequence number identifying the second data packet, a source version number, and/or a list of deltas. The source version number may be the same as the source version number included in the first data packet. The list of deltas may comprise the third view changes, and/or any unsent or unacknowledged view changes that the third view changes depend on. The source version number included in the second data packet may be the largest source version number known to the computing device. The computing device may set the source version to the largest source version number among the received target version numbers.

Steps 605-615 may be repeated to maintain state consistency between the computing device and the receiver. The state consistency may ensure accurate view replication between the computing device and the receiver. The computing device may determine view changes based on a first ongoing predetermined time interval (e.g., a first tick) and check whether an acknowledgement message has been received based on a second ongoing predetermined time interval (e.g., a second tick). The first ongoing predetermined time interval may be different from the second ongoing predetermined time interval. After the computing device sends the second data packets, the computing device may receive an acknowledgment message indicating receipt of the first data packet, but the computing device may not have received an acknowledgment message indicating receipt of the second data packet. The computing device may then generate a third data packet comprising a sequence number identifying the third data packet, a source version number corresponding to the target version number indicated by the acknowledgment message, and/or a list of deltas. The list of deltas may comprise fifth view changes relative to the target state indicated by the target version number and/or any unsent or unacknowledged view changes (e.g., in-flight deltas) that the fifth changes depend on. For example, the fifth view changes may comprise the fourth view changes and sixth view changes, and/or may exclude the first view changes. Each of the sixth view changes may be absent from the fourth view changes.

At step 617, the computing device may determine an end of the view changes. The computing device may determine that there are no additional view changes relative to a previous state (e.g., a current head state) for a period of time based on user input from the client device (e.g., no user input for a threshold period of time) and/or view updates from the computing device (e.g., view changes initiated by the computing device). The end of the view changes may be indicated by an end of a visual simulation session (e.g., a user logging out a game session, restart of a game session). If the computing device determines that there are no more view changes, the computing device may not send any additional data packets. Additionally or alternatively, the computing device may resend previous data packets that have not been indicated by the acknowledged messages received by the computing device.

Figure 7:
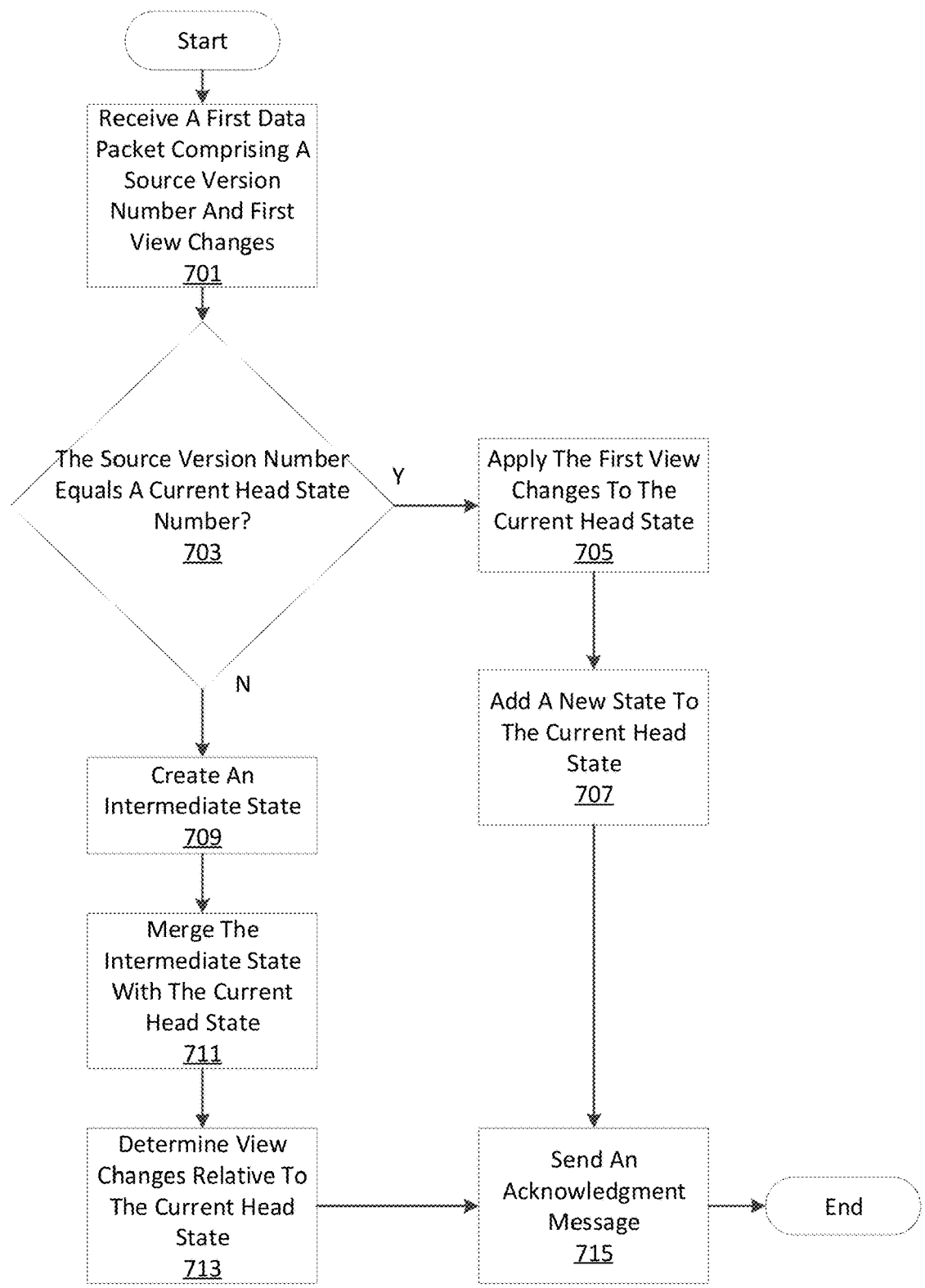
FIG. 7 is a flow chart showing an example method for receiving data packets and replicating views over an unreliable network.

FIG. 7 is a flow chart of an example method for receiving data packets and replicating views over an unreliable network. Steps of the method may comprise receiving data packets from a sender (e.g., the sender 210) and synchronizing the states and/or views based on the received data packets. The method describes an efficient and accurate view and/or state replication and synchronization process over an unreliable network between a sender and a receiver. The method may ensure that (1) a relatively small amount of data needs to be transmitted between the sender and the receiver; (2) each data packet sent by the sender or receiver may be processed immediately after being received; (3) latency at the receiver is bounded (e.g., a change made to the sender's view is reflected in the receiver's view within a fixed time bound); (4) latency is low even during periods when one or more data packets are dropped; (5) the use of bandwidth is efficient; and (6) complex view data types such as nested structures, maps, lists, sets, and/or queues are supported for view replication and synchronization. The description of FIG. 7 includes examples of computing devices that may perform various steps. However, any or all of those steps (and/or other steps) may be performed by one or more other computing devices. One or more steps may be combined, sub-divided, omitted, or otherwise modified, and/or added to other steps. The order of steps may be modified.

At step 701, a computing device (e.g., the receiver 220) may receive a first data packet from a sender (e.g., the sender 210). The first data packet may comprise a sequence number identifying the first data packet, a source version number, and first view changes. The first view changes may comprise a set of view changes of a graphically depicted visual simulation relative to a first state indicated by the source version number.

At step 703, the computing device may determine whether the source version number is equal to a current head state number. The computing device may store the current head state number that indicates a current head state. The current head state may indicate a latest state in a view history graph reconstructed by the computing device. If the source version number is equal to the current head state number, step 705 may be performed.

At step 705, the computing device may apply the first view changes to the current head state. For example, if the current head state indicates that a player is at a particular position/location, and the first view changes indicate that the player moves 10 feet in the east direction, the computing device may apply the movement of the player to the current position of the player.

At step 707, the computing device may add a new state to the current head state in the view history graph. For example, the computing device may add a new state in a linear branch following the current head state, as shown in FIG. 4A. Because the source version number is equal to the current head state number, the received first view changes are to be applied to the current head state.

If the source version number is not equal to the current head state number, step 709 may be performed. At step 709, the computing device may create an intermediate state. The intermediate state, for example, as shown in FIG. 4B, may be indicated by an intermediate head (e.g., the intermediate head 470) and may follow a previous head (e.g., a previous current head, the previous head 440). The computing device may apply the received first view changes (e.g., delta "b" in FIG. 4B) to a previous state (e.g., state 1 as shown in FIG. 4B), indicated by the previous head.

At step 711, the computing device may determine view changes relative to the current head state. Because the computing device has received more than one set of view changes to a previous state and has applied one set of view changes to the previous state to create the current state, the computing device may determine view changes relative to the current state. For example, the computing device may have applied previous view changes (e.g., as set of view changes to be applied to the previous state received before receiving the first view changes) to the previous state to create the current head state (e.g., apply delta "a" to state 1 to create state 2, as shown in FIG. 4B). The computing device may then determine a relation between the first view changes and the previous view changes and determine what view changes need to be applied to the current state. For example, if the first view changes comprise the previous view changes, the computing device may apply only the differences between the first view changes and the previous view changes to the current state. Additionally or alternatively, if the first view changes are not related to the previous view changes, the computing device may apply the first view changes to the current state.

At step 713, the computing device may merge the intermediate state with the current head state. The computing device may merge the first view changes with previous view changes applied to the previous head to create a new head state (e.g., state 3 indicated by the new head 460 in FIG. 4B). The computing device may apply the determined view changes relative to the current head state to create a new head state and add the new head state to the graph of view history.

At step 715, the computing device may send an acknowledgment message to the sender. The acknowledgement message may comprise a source version number, a list of sequence numbers, and/or a target version number. The source version number may be the same as the source version number included in the first data packet sent from the sender. The list of sequence numbers may identify the date packets that the receiver has received during a predetermined time interval. The target version number may indicate the new head state. The computing device may send an acknowledgment message to the sender before creating a new state or applying the first view change. The computing device may determine a timing of sending the acknowledgment message based on when a previous acknowledgment message is sent to the sender.

Steps 701-715 may be repeated to maintain state consistency between the computing device and the sender. The state consistency may ensure accurate view replication between the computing device and the sender. The computing device may check if any data packet has been received based on a first ongoing predetermined time interval (e.g., a first tick) and/or may send an acknowledgement message based on a second ongoing predetermined time interval (e.g., a second tick). The first ongoing predetermined time interval may be different from the second ongoing predetermined time interval.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:
sending, by a computing device, a first data packet to a client device, wherein the first data packet comprises:
a first sequence number identifying the first data packet,
a first source version number, and a first set of one or more changes to be applied to a first state identified by the first source version number, wherein the first state represents a view of a graphically depicted visual simulation presented on the client device;
based on a determination that a first acknowledgment message for receipt of the first data packet is not received by the computing device, sending a second data packet to the client device, wherein the second data packet comprises:
a second sequence number identifying the second data packet,
the first source version number, and
a second set of one or more changes to be applied to the first state identified by the first source version number, wherein the second set of one or more changes comprises the first set of changes and a third set of changes, wherein each change of the third set of changes is absent from the first set of changes;
receiving, after sending the second data packet, the first acknowledgement message, wherein the first acknowledgement message comprises a second source version number identifying a second state created by applying the first set of one or more changes to the first state; and
based on a determination that a second acknowledgment message for receipt of the second data packet has not been received, sending a third data packet to the client device, wherein the third data packet comprises:
a third sequence number identifying the third data packet,
the second source version number, and
a fourth set of one or more changes to be applied to the second state identified by the second source version number, wherein the fourth set of changes comprises the third set of changes and a fifth set of changes, wherein each change of the fifth set of changes is absent from the third set of changes, and wherein the four set of changes excludes the first set of changes.

2. The method of claim 1, further comprising:
based on a determination that the first acknowledgment message is received by the computing device, reclaiming memory associated with the first data packet.

3. The method of claim 1, wherein the sending the first data packet comprises sending, by the computing device, the first data packet to the client device based on a user datagram protocol (UDP).

4. The method of claim 1, wherein both the first set of one or more changes and the second set of one or more changes are associated with one or more views of the graphically depicted visual simulation.

5. The method of claim 1, wherein an application of the third set of changes to the first state depends on a prior application of the first set of changes to the first state.

6. The method of claim 1, wherein the first set of one or more changes is associated with a first branch linked to a branch node, the second set of one or more changes is associated with a second branch linked to the branch node, and the branch node represents the first state, and wherein the first branch and the second branch are merged by the client device to create a new branch node.

7. An apparatus comprising:
one or more processors; and
memory storing instructions that, when executed by the one or more processors, cause the apparatus to:
   send a first data packet to a client device, wherein the first data packet comprises:
      a first sequence number identifying the first data packet,
      a first source version number, and
      a first set of one or more changes to be applied to a first state identified by the first source version number, wherein the first state represents a view of a graphically depicted visual simulation presented on the client device;
   based on a determination that first acknowledgment message for receipt of the first data packet is not received, send a second data packet to the client device, wherein the second data packet comprises:
      a second sequence number identifying the second data packet,
      the first source version number, and
      a second set of one or more changes to be applied to the first state identified by the first source version number, wherein the second set of one or more changes comprises the first set of changes and a third set of changes, wherein each change of the third set of changes is absent from the first set of changes;
   receive, after sending the second data packet, the first acknowledgement message, wherein the first acknowledgement message comprises a second source version number identifying a second state created by applying the first set of one or more changes to the first state; and
   based on a determination that a second acknowledgment message for receipt of the second data packet has not been received, send a third data packet to the client device, wherein the third data packet comprises:
      a third sequence number identifying the third data packet,
      the second source version number, and
      a fourth set of one or more changes to be applied to the second state identified by the second source version number, wherein the fourth set of changes comprises the third set of changes and a fifth set of changes, wherein each change of the fifth set of changes is absent from the third set of changes, and wherein the four set of changes excludes the first set of changes.

8. The apparatus of claim 7, wherein the instructions, when executed by the one or more processors, cause the apparatus to:
   based on a determination that the first acknowledgment message is received, reclaim memory associated with the first data packet.

9. The apparatus of claim 7, wherein the instructions, when executed by the one or more processors, cause the apparatus to:
   send the first data packet to the client device based on a user datagram protocol (UDP).

10. The apparatus of claim 7, wherein both the first set of one or more changes and the second set of one or more changes are associated with one or more views of the graphically depicted visual simulation.

11. The apparatus of claim 7, wherein an application of the third set of changes to the first state depends on a prior application of the first set of changes to the first state.

12. The apparatus of claim 7, wherein the first set of one or more changes is associated with a first branch linked to a branch node, the second set of one or more changes is associated with a second branch linked to the branch node, and the branch node represents the first state, and
the first branch and the second branch are merged by the client device to create a new branch node.

13. One or more non-transitory computer-readable media storing instructions that, when executed, cause:
   sending a first data packet to a client device, wherein the first data packet comprises:
      a first sequence number identifying the first data packet,
      a source version number, and
      a first set of one or more changes to be applied to a first state identified by the source version number, wherein the first state represents a view of a graphically depicted visual simulation presented on the client device;
   based on a determination that first acknowledgment message for receipt of the first data packet is not received, sending a second data packet to the client device, wherein the second data packet comprises:
      a second sequence number identifying the second data packet,
      the source version number, and
      a second set of one or more changes to be applied to the first state identified by the source version number, wherein the second set of one or more changes comprises the first set of changes and a third set of changes, wherein each change of the third set of changes is absent from the first set of changes;
   receiving, after sending the second data packet, the first acknowledgement message, wherein the first acknowledgement message comprises a second source version number identifying a second state created by applying the first set of one or more changes to the first state; and
   based on a determination that a second acknowledgment message for receipt of the second data packet has not been received, sending a third data packet to the client device, wherein the third data packet comprises:
      a third sequence number identifying the third data packet,
      the second source version number, and
      a fourth set of one or more changes to be applied to the second state identified by the second source version number, wherein the fourth set of changes comprises the third set of changes and a fifth set of changes, wherein each change of the fifth set of changes is absent from the third set of changes, and wherein the four set of changes excludes the first set of changes.

14. The one or more non-transitory computer-readable media of claim 13, wherein the instructions, when executed, further cause:
   based on a determination that the first acknowledgment message is received, reclaiming memory associated with the first data packet.

15. The one or more non-transitory computer-readable media of claim 13, wherein the instructions, when executed, further cause:

the sending the first data packet by causing sending the first data packet to the client device based on a user datagram protocol (UDP).

16. The one or more non-transitory computer-readable media of claim 13, wherein both the first set of one or more changes and the second set of one or more changes are associated with one or more views of the graphically depicted visual simulation.

17. The one or more non-transitory computer-readable media of claim 13, wherein an application of the third set of changes to the first state depends on a prior application of the first set of changes to the first state.

18. The method of claim 1, further comprising:
creating a third state by applying the fourth set of one or more changes to the second state.

19. The apparatus of claim 7, wherein the instructions, when executed by the one or more processors, cause the apparatus to:
create a third state by applying the fourth set of one or more changes to the second state.

20. The one or more non-transitory computer-readable media of claim 13, wherein the instructions, when executed, further cause:
creating a third state by applying the fourth set of one or more changes to the second state.

* * * * *